United States Patent [19]

Land

[11] Patent Number: 4,815,331
[45] Date of Patent: Mar. 28, 1989

[54] RIGHT-HAND STEERING WHEEL FOR AN AUTOMOBILE

[76] Inventor: John F. Land, 511 Oak Ridge Dr., Neosho, Mo. 64850

[21] Appl. No.: 134,375

[22] Filed: Dec. 17, 1987

[51] Int. Cl.$^4$ .............................................. B62D 1/22
[52] U.S. Cl. ...................................... 74/494; 180/322
[58] Field of Search ................ 74/480 B, 480 R, 494, 74/479, 484 R, 485; 180/321, 322; 296/152, 153; 297/413; 108/44, 46

[56] References Cited

U.S. PATENT DOCUMENTS

| | | | |
|---|---|---|---|
| 1,274,978 | 8/1918 | Biship | 74/494 |
| 1,932,315 | 10/1933 | Klock | 74/494 |
| 2,544,635 | 3/1951 | Ostrow | 74/494 |
| 2,617,661 | 11/1952 | Kucera | 280/774 |
| 2,736,211 | 2/1956 | Umstott | 74/494 |
| 2,791,915 | 5/1957 | Merry | 74/562.5 |
| 2,963,919 | 12/1960 | Larsen | 74/494 |
| 3,003,363 | 10/1961 | De Hart | 74/494 |

*Primary Examiner*—Leslie A. Braun
*Assistant Examiner*—Janice Chartoff
*Attorney, Agent, or Firm*—William J. Miller

[57] ABSTRACT

A right-hand steering wheel for an automobile which is generally equipped with a left-hand steering wheel and at least a front right door, includes a clamp which is releasable attached to the left-hand steering wheel. A right-hand steering wheel is provided with a frame interconnecting the clamp with the right-hand steering wheel. Apparatus is provided for turning the left-hand steering wheel when the right-hand steering wheel is turned. The frame is attached to the right-hand door using an angle member which slips between the glass and the weather stripping belt of the right-hand automobile door. A telescoping rod is mounted in the frame and is connected pivotally to the angle member in a manner so that any misadjustment of the clamp on the left-hand steering wheel which would cause a lateral motion is accommodated by the telescoping apparatus. Furthermore, the telescoping apparatus accommodates the opening of the right-hand door permitting the user to exit the automobile without disassembling or removing the frame and other associated apparatus.

9 Claims, 2 Drawing Sheets

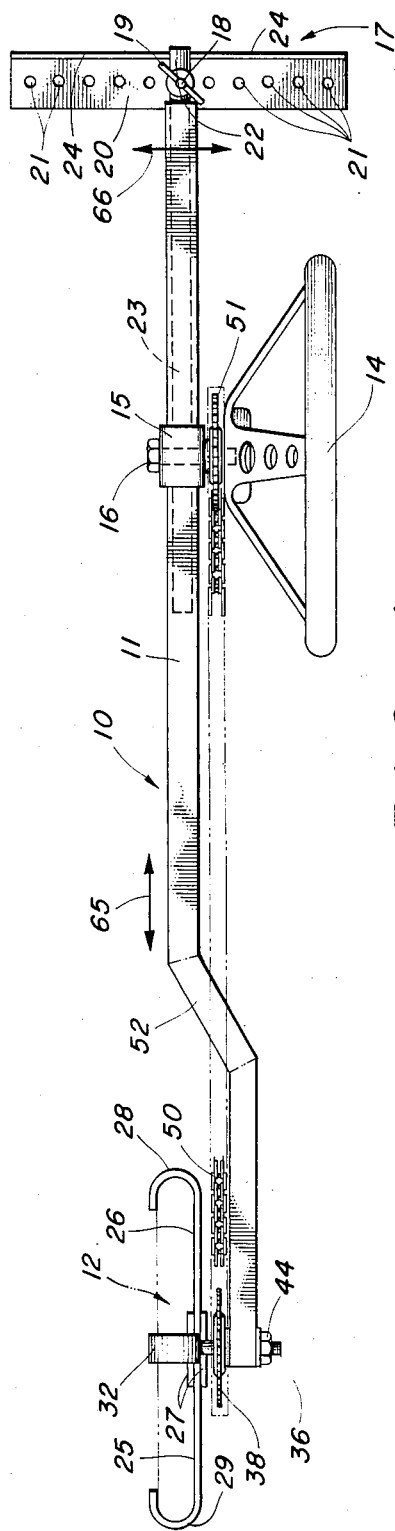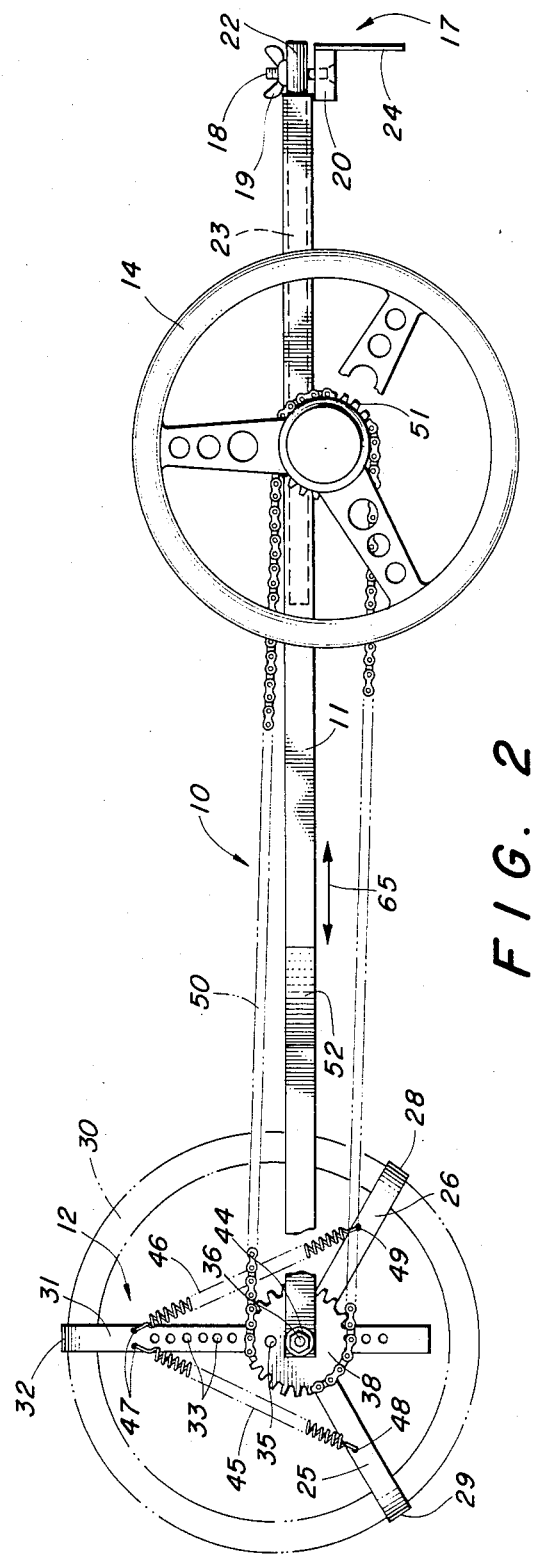

RIGHT-HAND STEERING WHEEL FOR AN AUTOMOBILE

BRIEF DISCUSSION OF THE PRIOR ART

The best prior art known to Applicant is U.S. Pat. No. 2,736,211 to H. D. Umstott which basically discloses a right-hand steering wheel mounted by a column attached to the floor and to a bracket on the dashboard. A sprocket drive is provided for coupling the right-hand steering to the left-hand steering column. The sprocket in the left-hand steering column is attached to the steering shaft by severing or removing the casing around the steering shaft and attaching the sprocket. A chain connects the sprocket from the left-hand steering wheel to the sprocket coupled to the right-hand steering wheel.

U.S. Pat. No. 2,617,661 to J. B. Kucera provides a bracket which is clamped to the left-hand steering wheel and provides a mounting for the right-hand steering wheel. A pulley and belt arrangement is provided with the pulley being attached to the left-hand steering wheel drive and a pulley being provided in the right-hand steering wheel drive, both of which are interconnected by a belt.

Other patents, such as U.S. Pat. No. 2,963,919 to D. Larsen, function in substantially the same manner as the patent to Umstott.

U.S. Pat. No. 3,003,363 to E. S. De Hart illustrates one means for clamping a servo-controlled system to the left-hand steering wheel of an automobile. The servo-controlled system is used for controlling the automobile external to the automobile.

U.S. Pat. No. 1,932,315 to C. Klock is substantially identical in its function and mounting as is the patent to Umstott.

BRIEF DESCRIPTION OF THE INVENTION

All of the above described patents have several common faults. First, the patents, such as those to Umstott, require a second mounted steering wheel on the right-hand side of the automobile which is rigidly attached to the automobile and generally requires cutting the carpet to attach brackets, etc., to the floor and dashboard in a manner to disfigure the automobile which will decrease its value and later sales. Furthermore, these patents require manipulation of the steering column in a manner to obtain access to the actual shaft connected to the steering wheel. In the modern automobile, this would require cutting through the steering wheel casing to obtain access to the drive shaft to the steering wheel. None of the above referenced patents disclose a method for coupling a steering apparatus to an automobile to accommodate the need for a right-hand drive which is commonly used for the delivery of mail, without the necessity of disfiguring the automobile in some manner.

This invention describes a system which can be clamped to the left-steering wheel and to the right-hand door in a manner to accommodate both misalignment of the pivot over the center of the steering wheel and for opening or closing the door. Such a device also can be easily removed from an automobile without doing any damage to the automobile while it is installed. Thus, the resale value of the automobile has not been decreased by the installation of the right-hand steering apparatus.

The invention essentially comprises a clamp which is attached to the left-hand steering wheel with a right-hand steering wheel attached to a frame. The frame is attached to a pivot location on the clamp attached to the left-hand steering wheel. Apparatus is also provided to adjust the clamp to the various size steering wheels and for adjusting the frame to various widths of automobiles. The frame is attached on its right side to the window, using an angle bracket with one leg of the angle extending between the window and the weather stripping belt on the inside of the automobile and the other leg being pivotally attached to a rod which telescopes into the frame. The telescoping feature accommodates misalignment of the pivot over the center of the steering wheel when the clamp is attached to the steering wheel. Furthermore, the telescoping feature accommodates steering wheels which are not round, but tend to be out-of-round for the design uniqueness of the steering wheel. Finally, the sliding rod permits opening and closing the right-hand door without having to disassemble or remove the steering apparatus frame.

These and other features are clearly described when reference is made to the FIGS., drawings and description of the invention.

BRIEF DESCRIPTION OF THE FIGURES

FIG. 1 is a top view of the right-hand driving apparatus showing the clamp and the angle bracket for attachment to the window of the right-hand door;

FIG. 2 is a front view of the apparatus illustrated in FIG. 1;

DETAILED DESCRIPTION OF THE INVENTION

Figure 3:
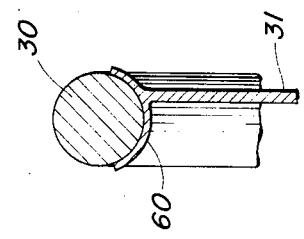
FIG. 3 is an alternate method for mounting the clamp illustrated in FIG. 4.

Referring to all of the drawings, but in particular to FIG. 1, a right-hand steering apparatus 10 is illustrated which essentially comprises a frame 11 which has a releasable clamp generally referred to by arrow 12 pivotally attached at one end by means of a bolt 36 to frame 11. A right-hand steering wheel 14 is attached to frame 11 by means of a slidable clamp 15 which is permanently secured into position by the use of a bolt 16. A window engagement angle member generally referred to by arrow 17 is pivotally attached by means of a bolt 18 and a wingnut 19. Bolt 18 is attached to horizontal portion 20 of angle engagement member 17 through one of a plurality of holes 21. Bolt 18 also passes through internal telescoping portion 22 which slides into the interior of frame 11 as illustrated by the dotted portion 23.

Figure 4:
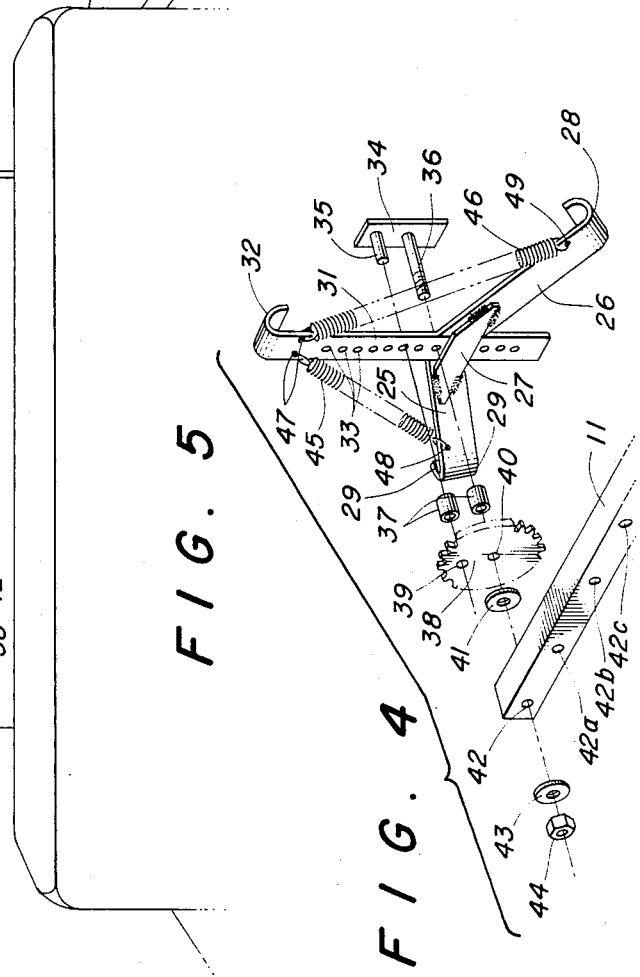
FIG. 4 is an exploded view of the clamping arrangement used for attaching the frame and sprocket to the left-hand steering wheel; and, FIG. 5 is a drawing illustrating the attachment of the right-hand driving apparatus to a window of an automobile and its installation inside the automobile.

Releasable clamp 12 is best illustrated in FIG. 4 and essentially comprises a "Y" shape having arms 25 and 26 which are attached at one end by two braces 27 which are welded on each side of arms 25 and 26 in the preferred embodiment to form an unitary structure. The opposite end of both portions 25 and 26 are "U" shaped ends 28 and 29 which are formed to pass around the periphery of a steering wheel 30 (see FIG. 2) which is the steering wheel location provided in most automobiles.

A third clamping member 31, likewise, has an "U" shaped end 32 adapted to pass around the periphery of steering wheel 30 as illustrated in FIG. 2. Clamping member 31 passes through the slot formed between braces 27 and the ends of members 25 and 26. This construction permits members 25 and 26 to slide freely along member 31 biased by springs to be later described. This configuration permits easy engagement or disengagement of the clamping means and, as a consequence, the entire frame and right-hand wheel from the automobile at the convenience of the user. All of the "U" shaped members 28, 29 and 32 can be covered with a heavy plastic sleeve or the "U" shaped members can be dipped in a similar plastic. Such plastic is well known and will not be discussed here. Clamping member 31 has a plurality of spaced holes 33 oriented longitudinally along the length of clamping member 31. These holes are used to position clamp 12 over the rotational axis of steering wheel 30. To accomplish the positioning of releasable clamp 12, a bracket 34 (see FIG. 4) is utilized which has a pin 35 and bolt 36 attached thereto. In normal use, bracket 34 is placed against the underside of clamping member 31 with pin 35 and bolt 36 passing through a pair of holes 33. The location of bolt 36 should be as near as possible to the rotational axis of steering wheel 30. Once bracket 34 is assembled against the underside of third clamping member 31, sleeves 37 are passed over pin 35 and bolt 36 and then a sprocket 38 is assembled over pin 35 and bolt 36 through a pair of openings 39 and 40, respectively. A washer 41 is then passed over bolt 36 against sprocket 38 and frame 11 is then assembled to the clamp by passing bolt 36 through an opening 42 in frame 11. A washer 43 and a nut 44 are then placed over bolt 36 and nut 44 is then tightened to complete the assembly. Springs 45 and 46 are attached between openings 47 and 48 for spring 45 and openings 47 and 49 for spring 46. Referring to FIG. 1, a chain 50 is assembled over sprocket 38 and a sprocket 51 on right-hand steering wheel assembly 14.

Figure 5:
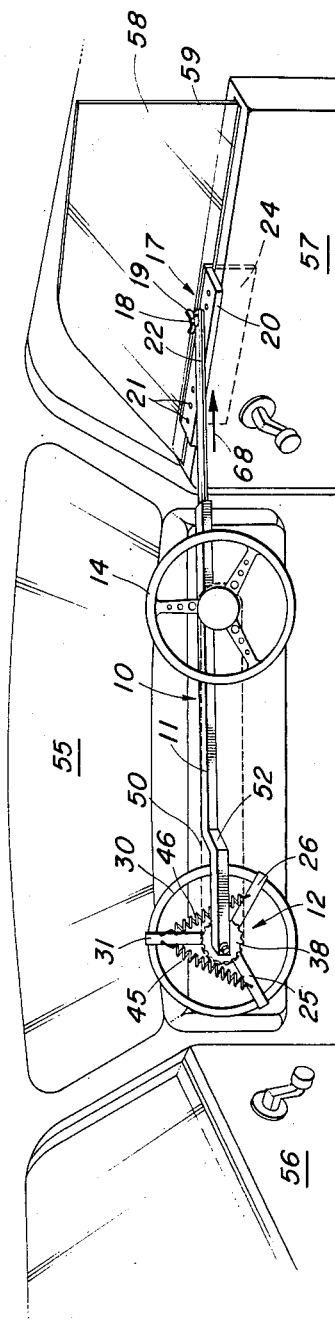

Referring in particular to FIG. 5, an automobile generally referred to by number 55 usually contains a left-hand door 56 and a right-hand door 57. Right-hand door 57 generally includes a piece of glass 58 and a weather stripping belt 59. A vertical portion 24 of angle engaging member 17 is inserted between weather stripping belt 59 and glass 58 of door 57.

Referring to FIG. 6, an alternate method of clamping members 25, 26 and 31 to steering wheel 30 is illustrated. Only one of the clamping members, such as 31, is illustrated. In this embodiment, a "C" shaped member 60 is attached to member 31, for example, and fits on the inside of steering wheel 30. The configuration illustrated in FIG. 6 is useful for persons who need to use the left-hand steering wheel as well as the right-hand steering wheel. An example would be a student driver in the left seat with the instructor in the right seat. The only variation in the clamping apparatus, in addition to the "C" shaped clamp 60, would be the arrangement of springs 45 and 46 which would by necessity need to be attached to the bottom of clamping member 31, instead of the top of clamping member 31 as illustrated.

OPERATION

The operation of the right-hand steering apparatus illustrated in FIGS. 1 through 6 is as follows. Referring in particular to FIGS. 1 through 4, clamp 12 is placed over the upper portion of steering wheel 30. Clamps 25 and 26 are slid down the lower portion of clamping members 31 until Clamps 28 and 29 slip on steering wheel 30. Springs 45 and 46 will retain releasable clamp 12 tightly against wheel 30 during use. The entire apparatus can easily be removed by merely pulling Clamps 25 and 26 downward until clamp 12 will release from wheel 30. Angle member 17 is then removed from the window and the entire apparatus stored until needed again. The clamp is normally disassembled by loosening nut 44, removing washer 43, frame 11, washer 41, sprocket 38, sleeves 37 and bracket 34. Bolt 36 is then inserted through whichever hole 33 is the closest to the center of rotation of steering wheel 30. Often times steering wheel 30 is not round, but is oval shaped for either utilitarian purposes or design purposes, thus, rendering the ability to clamp the steering wheel at the center of rotation either difficult or impossible, particularly when maintaining the clamp over the center of rotation when it is turned. In either case, if bolt 36 is not over the center of rotation, then bolt 36 when rotated will cause a shift of the frame, backward and forward, as illustrated by arrow 65. Such a shift would cause a problem in the rigid clamping of downwardly extending vertical portion 24. To accommodate such a shift in position, as illustrated by arrow 65, window engagement member 17 is attached to frame 11 by means of telescoping portion 22 which extends into frame 11 as illustrated by dotted portion 23 in FIG. 1. Any movement in the direction of arrow 65 would then be accommodated by a shift in frame 11 along telescoping portion 22, but will not cause a shift in the direction of arrow 66 as shown in FIG. 1. Since all movement of frame 11 can be easily accommodated by a movement of the frame within telescoping portion 22, the cross-sectional structure of telescoping portion 22 can either be square, rectangular or round and the invention is not so limited to any particular shape for telescoping portion 22. The telescoping rod is preferably round if steering wheel 30 is a "tilt" steering wheel so that rotation and frame 11 can be accommodated.

In addition to the above, the door (see FIG. 5) can be easily opened as illustrated by arrow 67 since telescoping portion 22 will slide in the direction of arrow 68. Thus, frame 11 will still be supported by door 57 and yet door 57 can easily be opened to accommodate entering or leaving the automobile by an individual. Furthermore, window 58 can be lowered completely and window angle engagement member 17 will remain fully clamped between weather stripping belt 59 and glass 58. The actual position of right-hand steering wheel 14 can be shifted laterally along frame 11 by loosening bolt 16 which will unclamp clamp 15 from around frame 11. Once bolt 16 is loosened, then wheel 14 can be positioned at any location along frame 11, as an example, it can be positioned to accommodate various sized interiors. It is obvious, of course, that once wheel 14 is repositioned, then chain 50 will need to be lengthened or shorten depending upon the final position of right-hand wheel 14.

Frame 11 is illustrated with a bend 52. Bend 52 will position steering wheel 14 closer to the dashboard of the automobile and away from the person doing the actual driving of the automobile. Bend 52 can be of any desired amount depending upon the room permitted between left-hand steering wheel 30 and the dashboard of the automobile.

Bolt 18 can be shifted to one of any of holes 21 in horizontal portion 20 to accommodate various makes of automobiles and various desired locations for wheel 14. It is preferable to place bolt 18 in a hole 21 in portion 20 in a manner so that chain 50 is aligned with wheel 30 when using the apparatus. Furthermore, window engagement member 17 can be positioned along weather striping belt 59 and window 58 as far forward as possible to prevent forward movement of wheel 14 when in use.

Clamp 12, used to couple the movement of right-hand steering wheel 14 to left-hand steering wheel 30, is clearly illustrated in FIG. 4 and operates in the following manner. Once the assembly, as shown in FIG. 4, has been disassembled, then clamping member 31 has its "U" shaped portion 32 placed over the top periphery of left-hand steering wheel 30. Bolt 36 is then passed through a selected opening 33 in a manner so that bolt 36 is as close to the center of rotation of wheel 30 as is possible. Clamping portions 25 and 26 are then slid upwardly along clamping portion 31 until they engage the underside of wheel 30 as illustrated in FIG. 5. Springs 45 and 46 will maintain an upwardly bias to keep "U" shaped clamping portions 28 and 29 into secured engagement with wheel 30. Sleeves 37 are inserted over pin 35 and bolt 36 as previously described; then completing the assembly by putting sprocket 38 with opening 40 passing over bolt 36 and opening 39 passing over pin 35. Washer 41 and frame 11 are then appropriately assembled with washer 43 and nut 44 securing the assembly. It is obvious that additional holes 42a, 42b and 42c can be used to accommodate other necessary modifications to an installation if needed.

Referring to FIG. 6, an alternate clamping system is illustrated with "C" clamp 60 attached to the inside of wheel 30 with similar clamping arrangements substituting for "U" shaped clamping members 28 and 29. Since the wheel is being clamped on the inside, it is obvious that bracket 27 which is welded to portions 25 and 26 can be urged in the opposite direction from that illustrated in FIG. 4. To accomplish this, springs 45 and 46 need merely to be connected to the bottom of portion 31 rather than hole 47 as illustrated.

The extreme versatility of the apparatus illustrated is evident when it is realized that the steering apparatus illustrated will also accommodate a tilt steering wheel. If wheel 30 is tilted in an upwardly direction and telescoping portion 22 is round, then frame 11 will merely pivot about telescoping portion 22 providing a means for tilting wheel 30 without having to change the location or attachment of right-hand steering apparatus 10.

It is obvious that other modifications and changes can be made and still be well within the spirit and scope of this invention as described in the specification and appended claims.

What I claim is:

1. A right-hand steering wheel for an automobile having a left-hand steering wheel and at least a front right door having at least a window and weather striping belt, comprising:
   (a) clamping means;
   (b) means for releasably attaching said clamping means to said left-hand steering wheel;
   (c) right-hand steering wheel means;
   (d) frame means having first and second ends and having a length extending at least from said left-hand steering wheel to the desired location of said right-hand steering wheel;
   (e) pivotal means;
   (f) means for adjustably attaching said pivotal means to said clamping means in a manner to center said pivotal means over the center of rotation of said left-hand steering wheel;
   (g) means for rotatably attaching said right-hand steering wheel to said frame means;
   (h) means for slidably attaching said frame means to said front right door; and,
   (i) means for coupling said left-hand steering wheel to said right-hand steering wheel in a manner to transfer any rotational movement of said right-hand steering wheel to said left-hand steering wheel.

2. An apparatus as claimed in claim 1 wherein said clamping means comprises:
   (a) a first clamping means having a longitudinal axis with one end configured to anchor to said left-hand steering wheel and having a plurality of spaced openings along its longitudinal axis;
   (b) a central bracket means having first and second spaced securing means attached thereto adapted to pass through said spaced openings on said first clamping means;
   (c) second and third clamping means each having first and second ends with said first ends slidably attached to said first clamping means and extending from said first clamping means at an angle less than 90° with respect to said longitudinal axis and wherein each of said second ends are configured to anchor to said left-hand steering wheel;
   (d) biasing means for using said second and third clamping means;
   whereby said first, second and third clamping means will rigidly attach and position said central bracket over the axis of rotation of said left-hand steering wheel with proper positioning of said openings over said first and second securing means; whereby said central bracket may be passed through an opening through said first clamping means near said axis of rotation of said steering wheel, thereby securing said clamping means at said center of rotation of said steering wheel.

3. Apparatus as claimed in claim 2 including a sprocket means having spaced openings therethrough, one of said spaced openings located at the center of rotation of said sprocket means for receiving one of said securing means and a second opening through said sprocket means for receiving said second securing means.

4. Apparatus as claimed in claim 1 wherein said means for slidably attaching said frame means to said front right door comprises:
   an angle means having first and second sides, with said first side dimensioned to slide between said window glass and said weather striping belt of said door and means for pivotally attaching said frame means to said second side.

5. Apparatus as claimed in claim 4 wherein frame means is adjustably attached to said second side by providing a plurality of spaced openings through said second side of said angle means and spaced along said angle means.

6. Apparatus as described in claim 1 wherein said means for slidably attaching said frame means to said front right door comprises:
   (a) angle member means having first and second sides;
   (b) rod means pivotally connected at one end to said angle members means; and,
   (c) means for slidably receiving said rod means in said frame means;
   whereby lateral movement of said left-hand steering wheel clamping means or movement of said right-hand door means will be accommodated by sliding of said rod means in said frame means.

7. Apparatus as claimed in claim 1 wherein said frame means is offset to move said right-hand steering wheel closer toward the front of said automobile.

8. Apparatus as claimed in claim 2 wherein said first, second and third clamping means are anchored around the external periphery of said steering wheel.

9. Apparatus as claimed in claim 2 wherein said first, second and third clamping means are configured to clamp against the inside of said steering wheel.

* * * * *